(12) United States Patent
Cherubini et al.

(10) Patent No.: US 10,809,219 B2
(45) Date of Patent: Oct. 20, 2020

(54) SENSOR FOR DETECTING A STATE OF A FLUID WITHIN A MICROFLUIDIC PLATE, SYSTEM FOR CONTROLLING A PREPARATION OF A SAMPLE INCLUDING A FLUID AND METHOD FOR DETECTING A STATE OF A FLUID WITHIN A MICROFLUIDIC PLATE

(71) Applicant: Roche Molecular Systems, Inc., Pleasanton, CA (US)

(72) Inventors: Claudio Cherubini, Cham (CH); Michal Dobrzynski, Lenzburg (CH); Paul Federer, Wolhusen (CH); Thomas Kern, Lucerne (CH); Lukas Schneider, Muri (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 130 days.

(21) Appl. No.: 15/717,720

(22) Filed: Sep. 27, 2017

(65) Prior Publication Data

US 2018/0095046 A1 Apr. 5, 2018

(30) Foreign Application Priority Data

Sep. 30, 2016 (EP) .................................... 16191811

(51) Int. Cl.
*G01F 23/26* (2006.01)
*G01N 27/22* (2006.01)
(Continued)

(52) U.S. Cl.
CPC ...... *G01N 27/226* (2013.01); *B01L 3/502715* (2013.01); *G01F 23/26* (2013.01);
(Continued)

(58) Field of Classification Search
None
See application file for complete search history.

(56) References Cited

U.S. PATENT DOCUMENTS 8,931,328 B2    1/2015  Allegato et al.
2006/0160171 A1* 7/2006  Bachur, Jr. ........... G01N 27/221
                                                                435/34
(Continued)

FOREIGN PATENT DOCUMENTS

WO    WO1987/006009    10/1987
WO    WO00/21659        4/2000
WO    2009069034 A1     6/2009

OTHER PUBLICATIONS

EP16191811.5 Search Report.

*Primary Examiner* — Paul S Hyun
(74) *Attorney, Agent, or Firm* — Maneesh Gupta; Pamela C. Ancona (57) ABSTRACT

A sensor (100) for detecting a state of a fluid within a microfluidic plate (120) is disclosed. The sensor (100) comprises at least a first planar electrode (102) and a second planar electrode (104) arranged parallel to one another so as to form an electric capacitor (106). The first planar electrode (102) and the second planar electrode (104) are configured to generate an electric field (114) within the fluid, wherein the sensor (100) is configured to detect the state of the fluid by means of a capacitance of the electric capacitor (106). Further, a system (116) for controlling a preparation of a sample including a fluid is disclosed. Furthermore, a method for detecting a state of a fluid within a microfluidic plate (120) is disclosed.

4 Claims, 3 Drawing Sheets

(51) Int. Cl.
*B01L 3/00* (2006.01)
*G01V 3/08* (2006.01)
(52) U.S. Cl.
CPC .............. *G01N 27/22* (2013.01); *G01V 3/088* (2013.01); *B01L 2200/14* (2013.01); *B01L 2300/0645* (2013.01); *B01L 2300/0829* (2013.01)

(56) References Cited

U.S. PATENT DOCUMENTS

| | | |
|---|---|---|
| 2006/0216203 A1 | 9/2006 | Fuller et al. |
| 2009/0149334 A1 | 6/2009 | Waterbury et al. |
| 2016/0097668 A1* | 4/2016 | Vilag .................. B67D 7/3272 222/65 |

* cited by examiner

SENSOR FOR DETECTING A STATE OF A FLUID WITHIN A MICROFLUIDIC PLATE, SYSTEM FOR CONTROLLING A PREPARATION OF A SAMPLE INCLUDING A FLUID AND METHOD FOR DETECTING A STATE OF A FLUID WITHIN A MICROFLUIDIC PLATE

CROSS-REFERENCE TO RELATED APPLICATIONS

The present application claims the benefit of priority under 35 U.S.C. § 119(a) of 16191811.5, filed Sep. 30, 2016. Reference is also made to EP16183569.9, filed Aug. 10, 2016; EP16002058.2 and EP16002057.4, each filed Sep. 23, 2016; EP16191425.4, filed Sep. 29, 2016; and EP16191771.1, EP16400044.0, each filed September 30. The disclosures of each of these applications are incorporated herein by reference in their entireties.

FIELD

The present disclosure is in the field of handling of fluid samples and more particularly relates to a sensor for detecting a state of a fluid within a microfluidic plate, system for controlling a preparation of a sample including a fluid and method for detecting a state of a fluid within a microfluidic plate.

RELATED ART

In consideration of the fact that there is an ongoing increase in chemical, biochemical and genetic analysis in assays, a strong demand for detecting the state of a fluid used within the analysis such as a liquid sample can be observed. An attempt was made to use optical sensors such as light barriers, refractive index, camera systems and the like to monitor a separation process. Optical detection has a great influence on the complexity and costs of the disposables used in the process and would adversely affect the cost of the detection instrument.

It is also known to use capacitive sensors to measure a vertical fill level in a sandwich structure. For example, WO1987/006009 A1 describes a capacitive chemical sensor for detecting the concentration of certain analytes, including hydrocarbons, in a liquid medium. The apparatus uses a planar or "open" capacitor containing an active layer. In response to the presence of a selected analyte in the liquid medium, the active layer causes capacitance to decrease with increasing analyte concentration. However, the presence of the active layer does not enable the detection of a state of a fluid.

SUMMARY

Therefore, the disclosure provides a sensor for detecting a state of a fluid within a microfluidic plate, the sensor comprising a first planar electrode and a second planar electrode, each of the first and second planar electrodes are arranged parallel to one another to form an electric capacitor, wherein the first planar electrode and the second planar electrode are configured to generate an electric field within the fluid, and the sensor detects a change in capacitance indicative of the state of the fluid.

Also provided is a system for controlling a preparation of a sample including a fluid, comprising a plurality of sensors as described herein operably connected to a power source configured to apply an alternating current to the first and second planar electrodes of the plurality of sensors.

Further provided is a method for detecting a state of a fluid within a microfluidic plate using at least one sensor, including providing a microfluidic plate, arranging the sensor adjacent to the microfluidic plate, filling the microfluidic plate with the fluid, generating an electric field within the fluid, and detecting the state of the fluid by sensing a change in capacitance of the electric capacitor.

BRIEF DESCRIPTION OF THE FIGURES

Further features and embodiments of the disclosure will be described in more detail in the subsequent description, particularly in conjunction with the dependent claims. Therein the respective features may be realized in an isolated fashion as well as in any arbitrary feasible combination, as a skilled person will realize. The embodiments are schematically depicted in the figures. Therein, identical reference numbers in these figures refer to identical elements or functionally identical elements.

DETAILED DESCRIPTION

Embodiments of the disclosed sensor, system and method aim allow to detect a state of a fluid. Disclosed herein are a sensor for detecting a state of a fluid within a microfluidic plate, a system for controlling a preparation of a sample including a fluid and a method for detecting a state of a fluid within a microfluidic plate.

Embodiments of the disclosed sensor for detecting a state of a fluid within a microfluidic plate, system for controlling a preparation of a sample including a fluid and method for detecting a state of a fluid within a microfluidic plate have the features of the independent claims. Further embodiments of the disclosure, which may be realized in an isolated way or in any arbitrary combination, are disclosed in the dependent claims.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly," "more particularly," "specifically," "more specifically" or similar terms are used in conjunction with additional/alternative features, without restricting alternative possibilities. Thus, features introduced by these terms are additional/alternative features and are not intended to restrict the scope of the claims in any way. The disclosure may, as the skilled person will recognize, be performed by using alternative features. Similarly, features introduced by "in an embodiment of the disclosure" or similar expressions are intended to be additional/alternative features, without any restriction regarding alternative embodiments of the disclosure, without any restrictions regarding the scope of the disclosure and without any restriction regarding the possibility of combining the features introduced in such way with other additional/alternative or non-additional/alternative features of the disclosure.

The disclosed sensor for detecting a state of a fluid within a microfluidic plate comprises at least a first planar electrode and a second planar electrode arranged parallel to one another so as to form an electric capacitor. The first planar electrode and the second planar electrode are configured to generate an electric field within the fluid. The sensor is configured to detect the state of the fluid by means of a capacitance of the electric capacitor.

The sensor is based on the findings that with this specific arrangement the electrodes are optimized so that most of the electrical field will flow through a portion of the microfluidic plate being a target position for the fluid. A fluid, present in this portion, changes the electrical field and the capacitance change can be evaluated enabling detection of the state of the fluid. The planar geometry of the electrodes is advantageous as the sensitivity of the electrical field is exactly inside the portion of the microfluidic plate being a target position for the fluid and possible inaccuracies of thickness and/or position of an upper part of the microfluidic plate do not generate a huge offset.

The term "microfluidic plate" as used herein refers to any plate-shaped device configured to permanently or temporarily store a small amount of a fluid. A small amount in this respect is to be understood as a quantity of fluid in the range of nl to ml such as 10 nl to 100 ml, preferably 0.1 µl to 10 ml and even more preferably 0.1 µl to 5 ml. Basically, the design of the microfluidic plate depends on the respective application of the microfluidic plate. Thus, the microfluidic plate may be designed as a device for storing a single fluid sample or a plurality of fluid samples. Similarly, the geometry of a respective storage area of the microfluidic plate depends on the respective application of the microfluidic plate. Thus, the storage area may be designed as a well, channel, depression, recess or the like.

The term "planar" as used herein refers to a three dimensional design of a device having a height significantly smaller than a length and width thereof. Significantly smaller means smaller by a factor of at least 3, e.g., at least 5 and specifically, at least 10.

The first planar electrode and the second planar electrode may be arranged within a common plane. Thus, the first and second electrodes are arranged in a flat configuration which permits the sensor to be positioned in small spaces.

The sensor may be configured to be arranged with the first planar electrode and the second planar electrode being parallel to the microfluidic plate. Thus, the sensor may be arranged in a kind of stacked configuration with the microfluidic plate allowing a compact arrangement.

The sensor may be arranged above or below the microfluidic plate with respect to a direction of gravity. Thus, the state of the fluid may be precisely detected as most of the electric field flows through the target position for the fluid in the microfluidic plate.

The sensor may further comprise a power source configured to apply an alternating current to the first planar electrode and the second planar electrode. Thus, the electrodes may be sourced with an alternating current signal, the frequency and/or power of which are not very important for the detection result. Thus, a stable and reliable configuration for the sensor is provided.

The first planar electrode and the second planar electrode may be arranged on a printed circuit board. Thus, a compact configuration is provided allowing to electrically contact the electrodes in a well-established and simple manner.

The sensor may be configured to detect the state of the fluid with the first planar electrode and the second planar electrode being spaced apart from the fluid. Thus, the electrodes do not contact the fluid which prevents damages of the electrodes. Nevertheless, this arrangement of the electrodes allows to reliably detect the state of the fluid.

The state of the fluid comprises at least one element of the group consisting of: presence of the fluid, absence of the fluid, predetermined mixture of the fluid with at least one component different from the fluid, presence of an enclosure of the fluid, absence of an enclosure of the fluid, fill level of the fluid, and flow rate of the fluid.

The term "presence of the fluid" as used herein refers to an at least partial presence of the fluid in the detection range of the sensor. Analogously, the term "absence of the fluid" as used herein refers to an at least partial presence of the fluid in the detection range of the sensor. Thus, the sensor may detect whether the fluid is present at the target position with the target quantity or not.

The term "predetermined mixture" as used herein refers to target mixing grade of the fluid with at least one other or further component. Thus, it may be detected whether the fluid has been correctly mixed or not.

The term "enclosure of the fluid" as used herein refers to any device storing the fluid. The term "presence of the enclosure" as used herein refers to an at least partial presence of any part of the device storing the fluid including but not limited to a cover, a vessel, a container or the like. Analogously, the term "absence of the enclosure" as used herein refers to an at least partial absence of any part of the device storing the fluid including but not limited to a cover, a vessel, a container or the like. Thus, the sensor may detect whether the fluid is completely and correctly enclosed or not.

The term "fill level" as used herein refers to a target quantity of the fluid and is defined in pl, µl, ml, µg, mg, or any other unit suitable to define an amount of the fluid.

The term "flow rate" as used herein refers to a volume flow or a mass flow of the fluid per amount of time.

The sensor may be further configured to detect a presence or absence of the microfluidic plate. Thus, the sensor may detect whether the microfluidic plate is ready or prepared to detect the state of the fluid or not.

The sensor may be further configured to detect the identity of the fluid. Thus, the sensor is suitable to detect whether the correct or target fluid is present in the microfluidic plate or not.

The fluid may be a liquid, particularly a biological liquid. Thus, the sensor is configured to detect the state of various kinds of samples.

The disclosed system for controlling a preparation of a sample including a fluid comprises a plurality of sensors as described above. Thus, the state of a plurality of fluids and/or the state of the fluid may be detected at a plurality of locations.

The disclosed method for detecting a state of a fluid within a microfluidic plate using at least one sensor as described above comprises providing a microfluidic plate, arranging the sensor adjacent the microfluidic plate, filling a fluid into the microfluidic plate, generating an electric field within the fluid, and detecting the state of the fluid by means of a capacitance of the electric capacitor. Thus, the state of the fluid may be reliably detected with this method.

The microfluidic plate may comprise at least one channel. The method may further comprise filling the fluid into the channel. Thus, the state of the fluid may be detected while the fluid is filled into the channel and/or flows there-through.

The method may further comprise filling a component different from the fluid so as to create a mixture. Thus, mixing process may be controlled.

The method may further comprise supplying a gas to the mixture, and detecting a predetermined mixture quality. The gas supply facilitates the mixing process. Further, the gas supply may be terminated when a predetermined mixing grade controlled by the sensor is realized.

The method may further comprise arranging two or more sensors along the at least one channel, and detecting a capacitance of the electric capacitor of each sensor. Thus, the state of the fluid may be detected at different locations along the channel which increases the detection result quality.

The microfluidic plate may be a multiwell plate comprising a plurality of wells. The method may further comprise filling the fluid into at least one well. The method may further comprise detecting the presence or absence of the fluid within the well.

The term "multiwell plate" as used herein refers to a flat plate with multiple "wells" used as small test tubes. Such a multiwell plate is also known as microtiter plate. The microplate has become a standard tool in analytical research and clinical diagnostic testing laboratories. A very common usage is in the enzyme-linked immunosorbent assay (ELISA), the basis of most modern medical diagnostic testing in humans and animals. A multiwell plate typically has 6, 24, 96, 384 or 1536 sample wells arranged in a 2:3 rectangular matrix. Some microplates have even been manufactured with 3456 or 9600 wells, and an "array tape" product has been developed that provides a continuous strip of microplates embossed on a flexible plastic tape. Each well of a microplate typically holds somewhere between tens of picolitres to several millilitres of liquid. They can also be used to store dry powder or as racks to support glass tube inserts. Wells can be either circular or square. For compound storage applications, square wells with close fitting silicone cap-mats are particular. Microplates can be stored at low temperatures for long periods, may be heated to increase the rate of solvent evaporation from their wells and can even be heat-sealed with foil or clear film. Microplates with an embedded layer of filter material were also developed, and today, there are microplates for just about every application in life science research which involves filtration, separation, optical detection, storage, reaction mixing, cell culture and detection of antimicrobial activity.

The method may further comprise detecting a fill level of the fluid and/or the presence or absence of a sealing foil sealing the well and/or the presence or absence of the multiwell plate.

The disclosure further discloses and proposes a computer program including computer-executable instructions for performing the method according to the disclosed sensor and/or method in one or more of the embodiments enclosed herein when the program is executed on a computer or computer network. Specifically, the computer program may be stored on a computer-readable data carrier. Thus, specifically, one, more than one or even all of the method steps as indicated above may be performed by using a computer or a computer network, in particular by using a computer program.

The disclosure further discloses and proposes a computer program product having program code means, in order to perform the method according to the disclosed sensor and/or method in one or more of the embodiments enclosed herein when the program is executed on a computer or computer network. Specifically, the program code means may be stored on a computer-readable data carrier.

Further, the disclosure contemplates a data carrier having a data structure stored thereon, which, after loading into a computer or computer network, such as into a working memory or main memory of the computer or computer network, may execute the method according to one or more of the embodiments disclosed herein.

The disclosure further contemplates a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, in a further embodiment, also provided is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, the disclosed sensor and/or method further includes:
   A computer or computer network comprising at least one processor, wherein the processor is adapted to perform the method according to one of the embodiments described in this description,
   a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Summarizing the findings of the disclosed sensor and/or method, the following embodiments are disclosed:

Embodiment 1

Sensor for detecting a state of a fluid within a microfluidic plate, comprising at least a first planar electrode and a second planar electrode arranged parallel to one another so as to form an electric capacitor, wherein the first planar electrode and the second planar electrode are configured to generate an electric field within the fluid, wherein the sensor is configured to detect the state of the fluid by means of a capacitance of the electric capacitor.

Embodiment 2

Sensor according to embodiment 1, wherein the first planar electrode and the second planar electrode are arranged within a common plane.

Embodiment 3

Sensor according to embodiment 1 or 2, wherein the sensor is configured to be arranged with the first planar electrode and the second planar electrode being parallel to the microfluidic plate.

Embodiment 4

Sensor according to any one of embodiments 1 to 3, wherein the sensor is configured to be arranged above or below the microfluidic plate with respect to a direction of gravity.

Embodiment 5

Sensor according to any one of embodiments 1 to 4, further comprising a power source configured to apply an alternating current to the first planar electrode and the second planar electrode.

Embodiment 6

Sensor according to any one of embodiments 1 to 5, wherein the first planar electrode and the second planar electrode are arranged on a printed circuit board.

Embodiment 7

Sensor according to any one of embodiments 1 to 6, wherein the sensor is configured to detect the state of the fluid with the first planar electrode and the second planar electrode being spaced apart from the fluid.

Embodiment 8

Sensor according to any one of embodiments 1 to 7, wherein the state comprises at least one element of the group consisting of: presence of the fluid, absence of the fluid, predetermined mixture of the fluid with at least one component different from the fluid, presence of an enclosure of the fluid, absence of an enclosure of the fluid, fill level of the fluid, and flow rate of the fluid.

Embodiment 9

Sensor according to any one of embodiments 1 to 8, wherein the sensor is further configured to detect a presence or absence of the microfluidic plate.

Embodiment 10

Sensor according to any one of embodiments 1 to 8, wherein the sensor is further configured to detect the identity of the fluid.

Embodiment 11

Sensor according to any one of embodiments 1 to 10, wherein the fluid is a liquid, particularly a biological liquid.

Embodiment 12

System for controlling a preparation of a sample including a fluid, comprising a plurality of sensors according to any one of embodiments 1 to 11.

Embodiment 13

Method for detecting a state of a fluid within a microfluidic plate using at least one sensor according to any one of embodiments 1 to 11, comprising providing a microfluidic plate, arranging the sensor adjacent the microfluidic plate, filling a fluid into the microfluidic plate, generating an electric field within the fluid, and detecting the state of the fluid by means of a capacitance of the electric capacitor.

Embodiment 14

Method according to embodiment 13, wherein the microfluidic plate comprises at least one channel, wherein the method further comprises filling the fluid into the channel.

Embodiment 15

Method according to embodiments 14, further comprising filling a component different from the fluid so as to create a mixture.

Embodiment 16

Method according to embodiment 15, further comprising supplying a gas to the mixture, and detecting a predetermined mixture quality.

Embodiment 17

Method according to any one of embodiments 13 to 16, further comprising arranging two or more sensors along the at least one channel, and detecting a capacitance of the electric capacitor of each sensor.

Embodiment 18

Method according to embodiment 13, wherein the microfluidic plate is a multiwell plate comprising a plurality of wells, wherein the method further comprises filling the fluid into at least one well, wherein the method further comprises detecting the presence or absence of the fluid within the well.

Embodiment 19

Method according to embodiment 18, further comprising detecting a fill level of the fluid and/or the presence or absence of a sealing foil sealing the well and/or the presence or absence of the multiwell plate.

Figure 1:
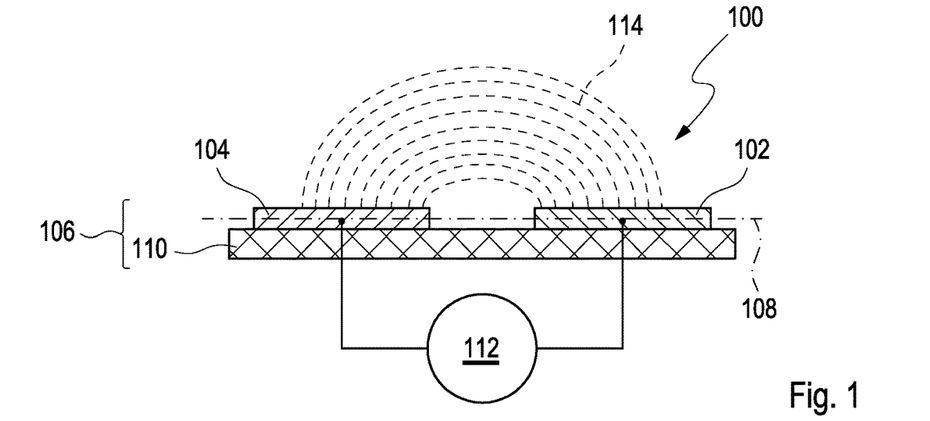
FIG. 1 shows a cross-sectional view of a sensor.

FIG. 1 shows a cross-sectional view of a sensor 100. The sensor 100 comprises at least a first planar electrode 102 and a second planar electrode 104. The first planar electrode 102 and the second planar electrode are arranged parallel to one another so as to form an electric capacitor 106. More particularly, the first planar electrode 102 and the second planar electrode 104 are arranged within a common plane 108. The first planar electrode 102 and the second planar electrode 104 are arranged on a printed circuit board 110. The sensor further comprises a power source 112 configured to apply an alternating current to the first planar electrode 102 and the second planar electrode 104. By applying an alternating current to the first planar electrode 102 and the second planar electrode 104, an electric field 114 is generated between the first planar electrode 102 and the second planar electrode 104 and the surroundings adjacent thereto.

Figure 2:
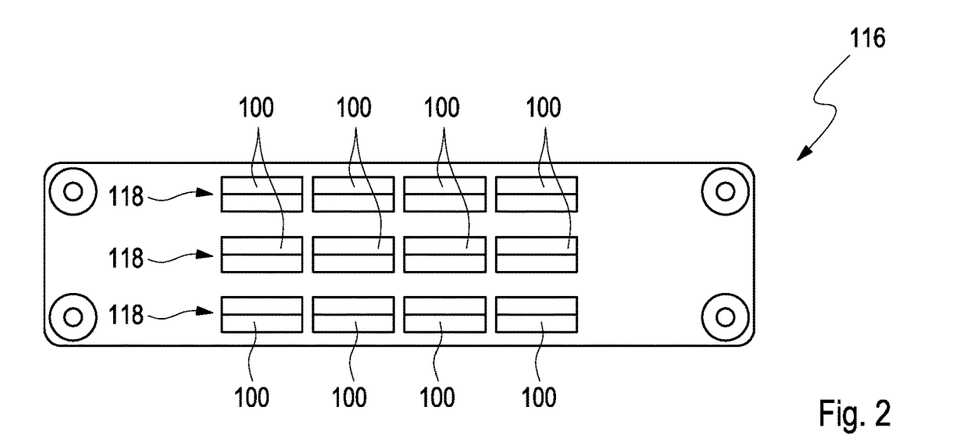
FIG. 2 shows a top view of a part of system for controlling a preparation of a sample according to a first embodiment.

FIG. 2 shows a top view of a part of a system 116 for controlling a preparation of a sample including a fluid according to a first embodiment. The system 116 comprises a plurality of sensors 100. In the present embodiment, the system 116 comprises 12 sensors 100, which are arranged in three parallel rows 118, each row 118 comprising four sensors 100.

Figure 3:
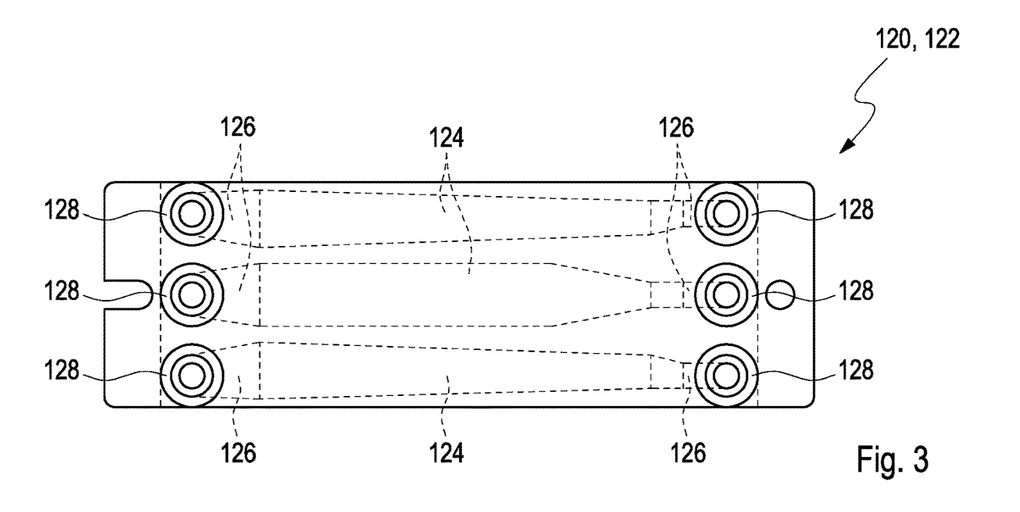
FIG. 3 shows a top view of a microfluidic plate according to a first embodiment.

FIG. 3 shows a top view of a microfluidic plate 120 according to a first embodiment, which may be part of the system 116. In the present embodiment, the microfluidic plate 120 is a disposable 122. The microfluidic plate 120 of this embodiment comprises at least one channel 124. For example, the microfluidic plate 120 comprises three channels 124. The channels 124 are arranged parallel to one another. Each channel 124 comprises two opposing ends 126. At each end of the channel 124, a port 128 is disposed through which a fluid may be filled into the channel 124 or withdrawn therefrom.

Figure 4:
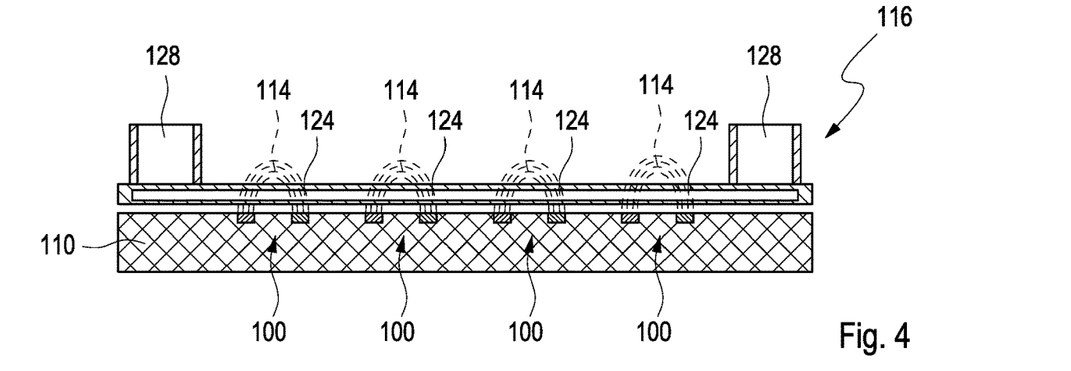
FIG. 4 shows a side view of the system according to the first embodiment.

FIG. 4 shows a side view of the system 116 according to the first embodiment. Hereinafter, it is referred to only one of the plurality of sensors 100 while the following explanations identically apply to the remaining sensors 100 unless otherwise stated. As shown in FIG. 4, the sensor 100 is configured to be arranged with the first planar electrode 102 and the second planar electrode 104 being parallel to the microfluidic plate 120. Particularly, the sensor 100 is configured to be arranged above or below the microfluidic plate 120 with respect to the direction of gravity. In the present embodiment, the sensor 100 is configured to be arranged below the microfluidic plate 120 with respect to the direction of gravity. Referring to the plurality of sensors 100, two or more sensors 100 are arranged along the at least one channel 124. As shown in FIG. 4, four sensors 100 are arranged along each channel 124.

Figure 5:
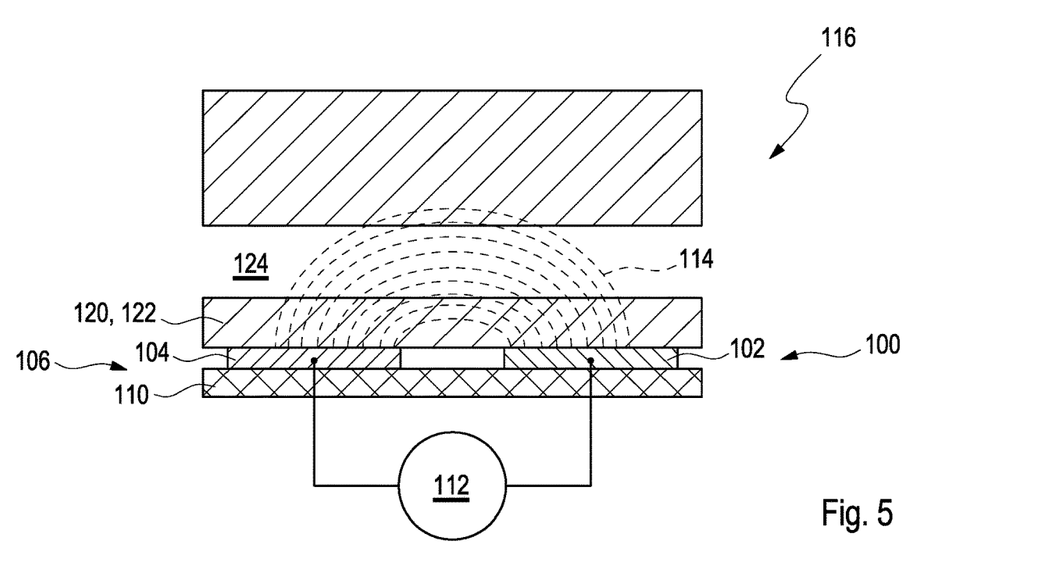
FIG. 5 shows a cross-sectional view of the system according to the first embodiment.

FIG. 5 shows a cross-sectional view of the system 116 according to the first embodiment. The sensor 100 is configured to detect a state of a fluid within the microfluidic plate 120 as will be explained in further detail below. The fluid may be a liquid and particularly a biological liquid. More particularly, the sensor 100 is configured to detect the state of the fluid with the first planar electrode 102 and the second planar electrode 104 being spaced apart from the fluid. With the arrangement shown in FIGS. 4 and 5, the first planar electrode 102 and the second planar electrode 104 are configured to generate an electric field 114 within the fluid. The sensor 100 is configured to detect the state of the fluid by means of a capacitance of the electric capacitor 106. The state comprises at least one element of the group consisting of presence of the fluid, absence of the fluid, predetermined mixture of the fluid with at least one component different from the fluid, presence of an enclosure of the fluid, absence of an enclosure of the fluid, fill level of the fluid, and flow rate of the fluid. The sensor 100 is further configured to detect the identity of the fluid.

Hereinafter, a method for detecting the state of a fluid within the microfluidic plate 120 will be described in further detail. The microfluidic plate 120 is provided and the sensor 100 is arranged adjacent the microfluidic plate 120 such as below the microfluidic plate 120. A fluid is filled into the microfluidic plate 120. In the present embodiment, a fluid is filled into each channel 124 through a respective port 128. An electric field 114 is generated by applying an alternating current to the first planar electrode 102 and the second planar electrode 104. As shown in FIG. 5, the electric field 114 is also generated within the channel 124 and the fluid filled therein. The state of the fluid is detected by means of a capacitance of the electric capacitor 106.

For example, the system 116 may be used to prepare a predetermined mixture of the fluid with at least one component different from the fluid and the mixing state is detected by the sensor 100. For this purpose, the component such as oil is filled into the channel 124 through a respective port 128. In order to facilitate the mixing process, a gas such as air is supplied to the mixture through the port 128 and a predetermined mixture quality detected. When the predetermined mixture quality has been realized, the gas supply is terminated.

Figure 6:
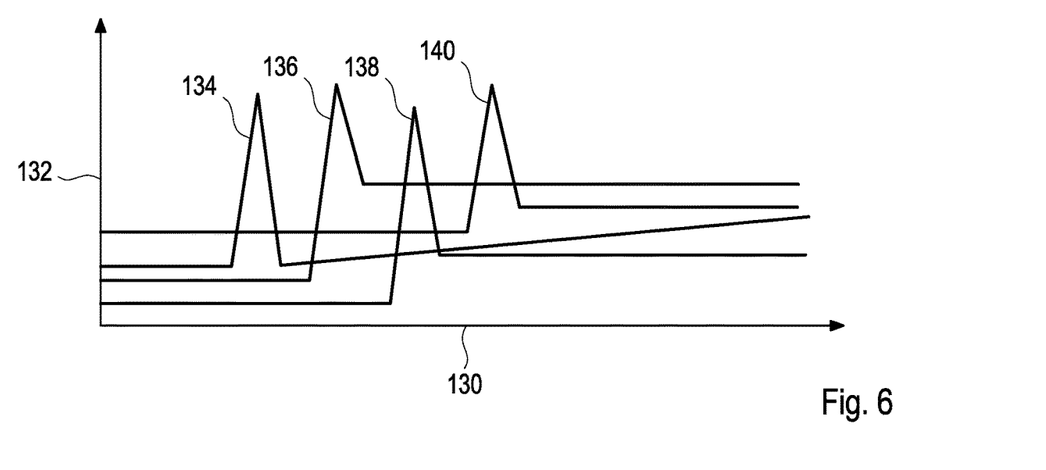
FIG. 6 shows a signal curve of an electrical capacity detected by the system according to the first embodiment.

FIG. 6 shows a signal curve of an electrical capacity detected by the system 116 according to the first embodiment. More particularly, FIG. 6 shows signal curves of the electric capacity detected from four sensors 100 arranged along one of the channels 124. The x-axis 130 represents the time and the y-axis 132 represents the capacity given in F. The signal curves 134, 136, 138, 140 represent the capacity detected by the respective four sensors 100 arranged along one of the channels 124. FIG. 6 shows the capacitance curves during filling of one of the channels 124 with the fluid. The time offset from sensor 100 to sensor 100 is clearly visible as the liquid fills up the channel 124. Further, the difference of the capacity between the fluid, the component, and the gas is clearly visible.

Figure 7:
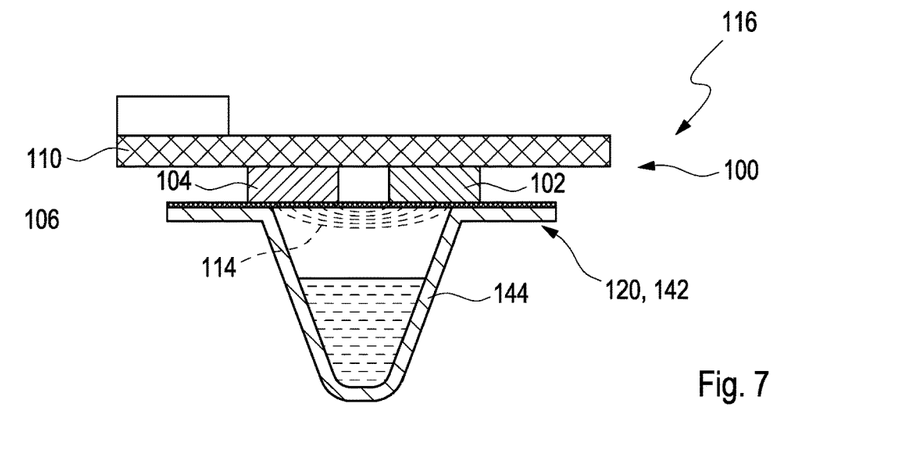
FIG. 7 shows a cross-sectional view of a system for controlling a preparation of a sample according to a second embodiment.

FIG. 7 shows a cross-sectional view of a system 116 for controlling a preparation of a sample according to a second embodiment. Hereinafter, only the differences from the system 116 according to the first embodiment will be described and like constructional members are indicated by like reference numbers.

The sensor 100 is arranged above the microfluidic plate 120. The microfluidic plate 120 is a multiwell plate 142 comprising a plurality of wells 144. The disclosed method further comprises filling of the fluid into at least one well 144. With the sensor 100, the presence or absence of the fluid within the well 144 may be detected. Further, a fill level of the fluid within the well 144 may be detected. Different filling levels of the wells 144 can be taken into account or measured at the same time as a pipetting quality control. Alternatively or in addition, the sensor 100 allows to detect the presence or absence of the multiwell plate 142. Alternatively or in addition, the sensor 100 allows to detect the presence or absence of a sealing foil 146 sealing the well 144 as will be explained in further detail below.

Figure 8:
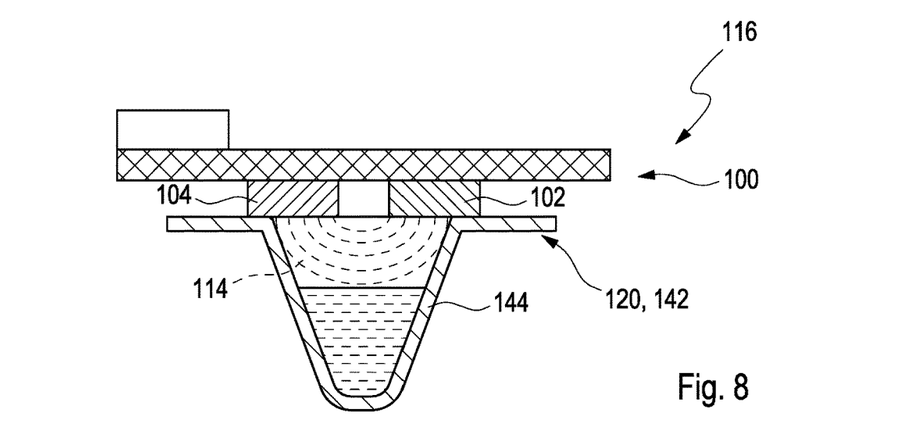
FIG. 8 shows another cross-sectional view of the system according to the second embodiment.

FIG. 8 shows another cross-sectional view of the system 116 according to the second embodiment. The difference from FIG. 7 is that the sealing foil 146 is omitted in FIG. 8. With the sensor 100, it can be detected if the sealing foil 146 has been added to the well 144 or not. The sealing foil 146 is essential to prevent evaporation during thermal cycling. If the electric fields 114 shown in FIGS. 7 and 8 are compared to one another, it is to be noted that the electric field 114 of FIG. 7 is smaller than the one of FIG. 8 due to the presence of the sealing foil 146 in FIG. 7. Thus, the difference in the electric fields 114 of FIGS. 7 and 8 causes a difference in the detected capacity slowing to detect whether the sealing foil 146 is present or not. Particularly, the detection results show that the sealing foil 146 prevents the propagation of the electric field 114.

Figure 9:
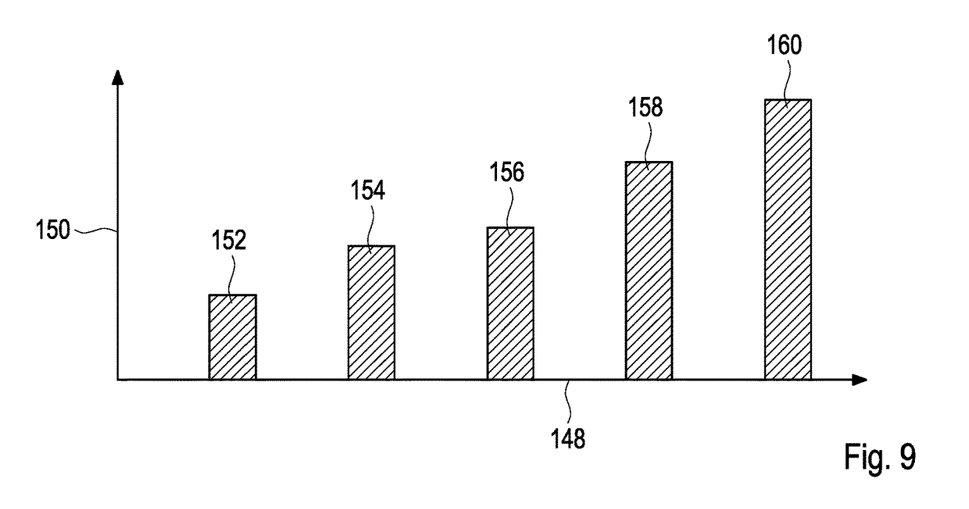
FIG. 9 shows a signal curve of an electrical capacity detected by the system according to the second embodiment.

FIG. 9 shows a signal curve of an electrical capacity detected by the system 116 according to the second embodiment. Particularly, the x-axis 148 represents different situations detected by the sensor 100 and the y-axis 150 represents the capacity given in F. Graph 152 represents the detection of an absence of the multiwell plate 142. Graph 154 represents the detection of a multiwell plate 142 having 96 wells 144 and the detection of an absence of a sealing foil 146. Graph 156 represents the detection of a multiwell plate 142 having 384 wells 144 and the detection of an absence of a sealing foil 146. Graph 158 represents the detection of a multiwell plate 142 having 96 wells 144 and the detection of a presence of a sealing foil 146. Graph 160 represents the detection of a multiwell plate 142 having 384 wells 144 and the detection of a presence of a sealing foil 146. As can be taken from the graphs 152, 154, 156, 158, 160, the sensor 100 and the system 116, respectively, allow to differentiate between different types of multiwell plates 142 as well as to detect the presence or absence of a sealing foil 146, among others. The different situations shown in FIG. 9 cause differences in the detected capacity allowing to distinguish between the respective situations.

The present application is not to be limited in scope by the specific embodiments described herein. Indeed, various modifications in addition to those described herein will become apparent to those skilled in the art from the foregoing description and accompanying figures. Such modifications are intended to fall within the scope of the claims. Various publications are cited herein, the disclosures of which are incorporated by reference in their entireties.

LIST OF REFERENCE NUMBERS 100 sensor
102 first planar electrode
104 second planar electrode
106 capacitor
108 common plane
110 printed circuit board
112 power source
114 electric field
116 system
118 row
120 microfluidic plate
122 disposable
124 channel
126 end
128 port
130 x-axis
132 y-axis
134 signal curve
136 signal curve
138 signal curve
140 signal curve
142 multiwell plate
144 well
146 sealing foil
148 x-axis
150 y-axis
152 graph
154 graph
156 graph
158 graph
160 graph

The invention claimed is:

1. A method for detecting a state of a fluid within a microfluidic plate using at least one sensor for detecting a state of a fluid within a microfluidic plate, the at least one sensor comprising an electric capacitor including a first planar electrode and a second planar electrode, wherein the first planar electrode and the second planar electrode are arranged within a common plane and parallel to one another, wherein the first planar electrode and the second planar electrode are configured to generate an electric field within the fluid, and wherein the at least one sensor is configured to detect the state of the fluid by means of a capacitance of the electric capacitor, the method comprising:
 providing a microfluidic plate, the microfluidic plate being a multiwell plate comprising a plurality of wells,
 arranging the at least one sensor above the multiwell plate with respect to a direction of gravity,
 filling at least one well of the microfluidic plate with the fluid,
 generating an electric field within the fluid,
 detecting the state of the fluid by sensing a change in capacitance of the electric capacitor, wherein the state of the fluid comprises at least one of (a) a presence of the fluid, (b) an absence of the fluid, (c) a fill level of the fluid, and (d) a flow rate of the fluid, and
 detecting the presence or absence of a sealing foil sealing the at least one well by sensing the change in capacitance of the electric capacitor.

2. A method according to claim 1, wherein the step of detecting the state of the fluid comprises detecting the presence or absence of the fluid within the at least one well.

3. A method according to claim 2, further comprising detecting a fill level of the fluid.

4. A method of claim 1, further comprising identifying a quantity of wells in the multiwell plate based on the capacitance of the electric capacitor.

\* \* \* \* \*